(12) United States Patent
Huber (10) Patent No.: US 12,058,128 B2
(45) Date of Patent: Aug. 6, 2024

(54) SETTING UP A CONNECTION

(71) Applicant: Telia Company AB, Solna (SE)

(72) Inventor: Michael Huber, Täby (SE)

(73) Assignee: TELIA COMPANY AB, Solna (SE)

( * ) Notice: Subject to any disclaimer, the term of this patent is extended or adjusted under 35 U.S.C. 154(b) by 210 days.

(21) Appl. No.: 17/221,151

(22) Filed: Apr. 2, 2021

(65) Prior Publication Data

US 2021/0314319 A1    Oct. 7, 2021

(30) Foreign Application Priority Data

Apr. 6, 2020  (FI) ...................... 20205356

(51) Int. Cl.
  *G06F 7/04*     (2006.01)
  *H04L 9/40*     (2022.01)
(52) U.S. Cl.
  CPC ...... *H04L 63/0876* (2013.01); *H04L 63/0272* (2013.01); *H04L 63/0823* (2013.01); *H04L 63/083* (2013.01)
(58) Field of Classification Search
  CPC ............. H04L 63/0876; H04L 63/0272; H04L 63/0823; H04L 63/083; H04L 63/0892; H04L 63/10; G06F 21/31; G06F 21/33; G06F 21/335; G06F 21/44; H04W 12/06; H04W 12/069
  See application file for complete search history.

(56) References Cited

U.S. PATENT DOCUMENTS

| 7,194,761 | B1 |   | 3/2007 | Champagne |            |
|-----------|----|---|--------|-----------|------------|
| 7,411,981 | B1 | * | 8/2008 | Reed      | H04L 63/08 |
|           |    |   |        |           | 709/217    |
| 7,574,737 | B1 |   | 8/2009 | Loh       |            |
| 7,681,037 | B2 | * | 3/2010 | Yoshida   | H04L 63/08 |
|           |    |   |        |           | 713/153    |

(Continued)

OTHER PUBLICATIONS

Zhou et al. Analysis and Improvements of PEAP Protocol in WLAN, Aug. 5, 2012, IEEE, pp. 918-922. (Year: 2012).*

(Continued)

*Primary Examiner* — Philip J Chea
*Assistant Examiner* — Jenise E Jackson
(74) *Attorney, Agent, or Firm* — NIXON & VANDERHYE (57) ABSTRACT

The invention relates to a method for setting up a communication connection to a server for a requesting network device. The method comprises: receiving reference authentication data; storing the reference authentication data; comparing received the authentication data of the requesting network device to the reference authentication data; requesting a communication connection from the server; and generating an acknowledgement signal to the requesting network device, the acknowledgement signal indicating the requesting network device an acceptance to connect to the server and a network address to be used for the connection, receiving a connection request from the network device; and combining the connection request with the communication connection set up between the authentication server and the server. The invention also relates to an authentication server device, a communication system, and a computer program product.

15 Claims, 3 Drawing Sheets

(56) References Cited

U.S. PATENT DOCUMENTS

| | | | |
|---|---|---|---|
| 7,685,312 B1* | 3/2010 | Caronni | H04L 61/35 |
| | | | 709/215 |
| 8,767,526 B1* | 7/2014 | Jagannatharao | H04W 12/069 |
| | | | 370/242 |
| 9,461,980 B1* | 10/2016 | Agrawal | H04L 63/08 |
| 10,547,599 B1 | 1/2020 | Mehta et al. | |
| 2005/0120221 A1* | 6/2005 | Arnold | H04L 67/14 |
| | | | 713/182 |
| 2006/0062228 A1* | 3/2006 | Ota | H04L 12/2856 |
| | | | 370/401 |
| 2008/0028445 A1* | 1/2008 | Dubuc | H04L 63/0892 |
| | | | 726/5 |
| 2009/0165096 A1* | 6/2009 | Hughes | H04L 63/08 |
| | | | 726/5 |
| 2012/0284786 A1 | 11/2012 | Somani et al. | |
| 2013/0212653 A1 | 8/2013 | Hoghaug | |
| 2015/0043561 A1 | 2/2015 | Xia | |
| 2016/0226848 A1* | 8/2016 | Yuan | H04L 63/102 |
| 2017/0041786 A1* | 2/2017 | Li | H04W 12/04 |
| 2017/0111336 A1* | 4/2017 | Davis | H04L 63/029 |
| 2017/0171199 A1 | 6/2017 | Bao et al. | |
| 2017/0374551 A1 | 12/2017 | Shen et al. | |
| 2018/0083942 A1* | 3/2018 | Someya | H04L 63/20 |
| 2018/0115554 A1* | 4/2018 | Dyon | H04L 63/164 |
| 2018/0212930 A1 | 7/2018 | Cammisa et al. | |
| 2019/0230491 A1* | 7/2019 | Yu | H04W 8/082 |
| 2020/0213151 A1* | 7/2020 | Srivatsan | H04L 12/4641 |

OTHER PUBLICATIONS

Singh et al, Survey and Analysis of Modern Authentication System, Dec. 18, 2016, IEEE, pp. 1-6. (Year: 2016).*

Hauser et al, Establishing a Session Database for SDN using 802.1X and Multiple Authentication Resources, May 25, 2017, pp. 1-7. (Year: 2017).*

Search Report for FI20205356, dated Oct. 13, 2020, 2 pages.

European Search Report issued in EP Patent Application No. 21 16 6149 dated Aug. 27, 2021.

* cited by examiner

SETTING UP A CONNECTION

This application claims priority to FI Patent Application No. 20205356 filed 6 Apr. 2020, the entire contents of which is hereby incorporated by reference.

TECHNICAL FIELD

The invention concerns in general the technical field of telecommunications. More particularly, the invention concerns setting up a connection.

BACKGROUND

Nowadays, individuals' rights especially regarding to a control of personal data is increased. There has been established regulation over the matter, such as the General Data Protection Regulation (GDPR), to empower individuals and give them control over their personal data. The regulation defines aspects with respect to the personal data in at least the following areas: the right of access the personal data, the right to rectification of the personal data, the right to erasure of the personal data, the right to restrict processing of the personal data, the right to data portability of the personal data, the right to object and the right not to be subject to a decision based solely on automated processing of the personal data.

In the existing digital communication environment the regulation causes challenges in several areas. Namely, from an end user perspective it is not the most desired situation to provide personal data to a plurality of entities because the management of the personal data becomes impossible. For example, in a situation in which the end user has bought a new network device, such as a mobile phone or a routing device, and registers the device, e.g. using with her/his personal data, to a device manufacturer's database. In addition to this, an operation of the device may require a network subscription which again requires a provision of personal data by the end user to another entity. As may be seen from the above, the personal data ends up easily to a plurality of instances e.g. in response to a purchase of a device.

Generally speaking, it would be advantageous from a user point of view if only one party stores any personal data of the user and provides authentication service to other entities. Especially, in a situation where there is a need to register a device in a manufacturer's database e.g. in order to get application updates it would be advantageous to isolate user's personal data from manufacturer's registration database since there is no point in storing the personal data for such a purpose, and enable a setup of communication connection between different entities in a secure way.

A known solution for the above is that a user subscription e.g. to a mobile communication network is mapped to another entity or operation, such as to the manufacturer's device registration.

Hence, there is need to introduce solutions which mitigate at least in part the drawbacks of the existing solutions as well as provide a sophisticated way to set up a communication connection.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention.

The following summary merely presents some concepts of the invention in a simplified form as a prelude to a more detailed description of exemplifying embodiments of the invention.

An object of the invention is to present a method, an authentication server device, a communication system, and a computer program product for setting up a communication connection.

The objects of the invention are reached by a method, an authentication server device, a communication system, and a computer program product for setting up a communication connection as defined by the respective independent claims.

According to a first aspect, a method for setting up a communication connection to a server for a network device is provided, the method comprises: receiving, by an authentication server device, reference authentication data from the server, the reference authentication data defining access parameters for a network device; storing, by the authentication server device, the reference authentication data in the authentication server; receiving, by the authentication server device, an access request from a requesting network device, the access request comprising authentication data for the requesting network device; comparing, by the authentication server device, the authentication data of the requesting network device to the reference authentication data; in response to a detection that a comparison result expresses that the authentication data of the requesting network device and the reference authentication data correspond to each other requesting, by the authentication server device, a setup of a communication connection from the server, a request of the communication connection comprising data indicating an identity of the requesting network device to the server; generating, by the authentication server device, an acknowledgement signal to the requesting network device, the acknowledgement signal indicating the requesting network device an acceptance to connect to the server and a network address to be used for the connection; receiving a connection request from the network device with the network address provided to the network device to be used for the connection; and combining the connection request from the network device with the communication connection set up between the authentication server device and the server for setting up the communication connection between the network device and the server.

The request of the communication connection to the server may be delivered over a secured communication channel. For example, the secured communication channel may be set up with a virtual private network connection.

Further, the network address to be used for the connection between the network device and the authentication server device may be selected among dedicated network address space of the authentication server for communicating in a virtual private network.

The authentication server device may be a Radius server.

Still further, a communication between the authentication server device and the server may be performed through at least one entity arranged to perform control operations in a communication network.

The authentication data applied to in the authentication may e.g. be at least one of: username and password; authentication certificate.

According to a second aspect, an authentication server device for setting up a communication connection to a server for a requesting network device is provided, the authentication server device comprising: at least one processor; at least one memory including computer program code; the at least one memory and the computer program code configured to, with the at least one processor, cause the authentication server device to perform: receive reference authentication data from the server, the reference authentication data defining access parameters for a network device; store the reference authentication data in the authentication server; receive an access request from a requesting network device, the access request comprising authentication data for the requesting network device; compare the authentication data of the requesting network device to the reference authentication data; request, in response to a detection that a comparison result expresses that the authentication data of the requesting network device and the reference authentication data correspond to each other, a communication connection from the server, a request of the communication connection comprising data indicating an identity of the requesting network device to the server; generate an acknowledgement signal to the requesting network device, the acknowledgement signal indicating the requesting network device an acceptance to connect to the server and a network address to be used for the connection; receive a connection request from the network device with the network address provided to the network device to be used for the connection; and combine the connection request from the network device with the communication connection set up between the authentication server and the server for setting up the communication connection between the network device and the server.

The authentication server device may be arranged to deliver the request of the communication connection to the server over a secured communication channel. For example, the authentication server device may be arranged to set up the secured communication channel with a virtual private network connection.

For example, the authentication server device may be a Radius server.

Moreover, the authentication server device may be arranged to perform a communication between the authentication server device and the server through at least one entity arranged to perform control operations in a communication network.

The authentication server device may further be arranged to use as the authentication data applied to in the authentication at least one of: username and password; authentication certificate.

According to a third aspect, a communication system is provided, the communication system comprising: a network device; a server; and an authentication server device according to second aspect above.

According to a fourth aspect, a computer program product for setting up a communication connection to a server is provided which computer program product, when executed by at least one processor, cause an authentication server device to perform the method according to the first aspect above.

The expression "a number of" refers herein to any positive integer starting from one, e.g. to one, two, or three.

The expression "a plurality of" refers herein to any positive integer starting from two, e.g. to two, three, or four.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

FIG. 1 illustrates schematically a communication system into which the invention may be implemented to.

DESCRIPTION OF THE EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated.

Figure 1:
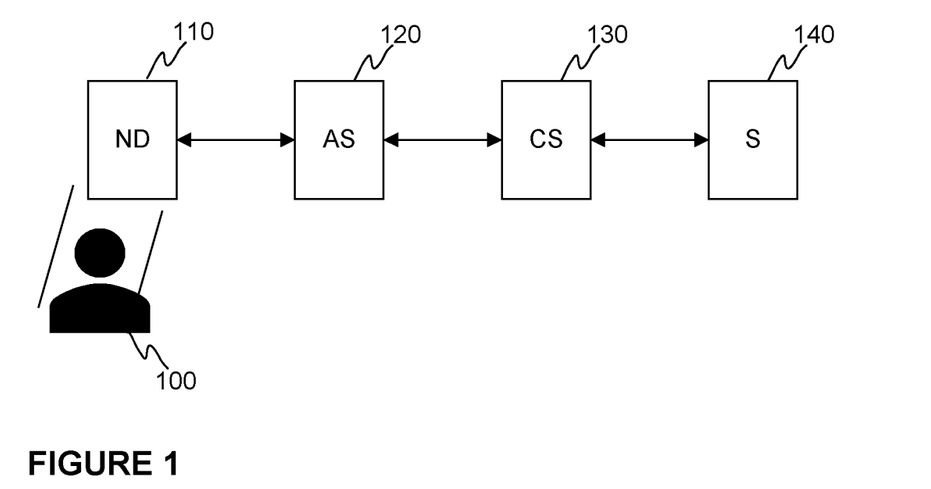

FIG. 1 illustrates schematically a communication environment, or a communication system, into which the present invention may be implemented to. The communication environment comprises a plurality of entities arranged to communicate with each other. For a purpose of understanding aspects of the present invention it may be assumed that a user 100 possesses a network device 110 manufactured by a party, such as manufacturer, which has arranged a server 140 for providing support to the network device 110, such as configuration updates for the network device 110, or any other support suitable to be implemented through a communication connection for the network device 110. The network device 110 shall be understood to be any device accessible through a communication connection. Some non-limiting examples of the network device 110 may be a user equipment, such as a mobile phone, a tablet computer, a laptop computer, or an IoT (Internet of Things) device, such as a lamp or a dishwasher, or a local network device, such as a Wi-Fi base station or a routing device. The server 140 may refer to a device configured to maintain data relating to the network device 110 and a data record for the network device 110 may be established in response to manufacturing the network device 110, wherein the data record may be activated through a registration of the network device 110. Moreover, at least part of the data maintained by the server 140 may be arranged to be downloadable to the network device 110 or updateable e.g. from the network device 110, or some other entity. As schematically illustrated in FIG. 1 the communication environment may comprise an authentication server 120 and one or more network entities 130, such as entities implementing control service functions e.g. managed by a telecom operator. The network entities 130 may e.g. refer to control service entities implementing the functions either in back end network or front end network, for example. Still further, the mentioned entities may implement routing functions for the communication network. The telecom operator may also, at least in part, to control and manage the authentication server.

Figure 2:
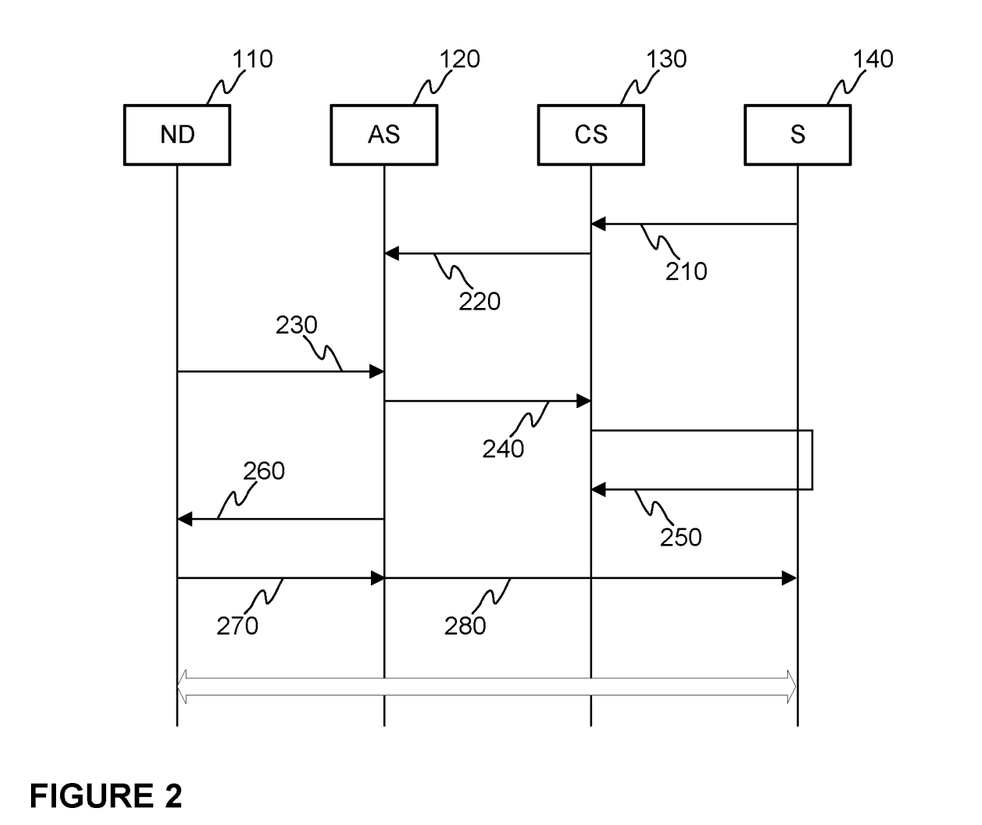
FIG. 2 illustrates schematically a flow chart of signaling between entities related to the invention according to an embodiment of the invention.

Next, for describing at least some further aspects relating to the present invention it is referred to FIG. 2 illustrating schematically signalling between the mentioned entities as a flow chart. The solution may be initiated so that the server 140 is configured to deliver data comprising at least a reference authentication data from the server 140 to an authentication server 120. Generation of the reference authentication data may be performed by any entity e.g. controlled by a manufacturer of the network device 110. The reference authentication data may define one or more access parameters for the network device 110 wherein the reference authentication data may e.g. define a username and a password or a predefined certificate to be used for authentication for the network device 110. Additionally to that the delivered data from the server 140 may comprise metadata defining the network device 110 related information, such as one or more of the following: the name of the manufacturer, a serial number of the network device 110, the model of the network device 110, information on the operating system, information on the configuration of the network device 110, applications installed to the network device 110, version information of the applications and other software, and so on. The data may be delivered through the network entities 130 which may copy, or even remove, a portion of the delivered data. According to some embodiments of the invention at least the reference authentication data may be stored in the authentication server 120. The above described signals are referred with references 210 and 220 in FIG. 2.

At some instant of time the network device 110 may initiate to perform operations towards the authentication server 120. Depending on the implementation and/or a type of the network device 110 the initiation may occur in response to a power up of the network device 110 and a setup of a communication connection to a communication network. The initiation may occur either automatically in response to the power up of the network device 110 or through an interaction with the user 100. In any case, the network device 110 may generate a signal 230 and initiates a communication towards the server 140 by delivering an access request to the authentication server 120. The access request 230 may comprise authentication data for the requesting network device 110. The authentication data included in the signal with other possible data may e.g. be input by the user 100 or automatically included in the access request 230 e.g. so that in response to the power up of the network device 110 the authentication data stored in a memory of the network device 110 is retrieved from the memory and included in the access request 230 for requesting access to the server 140 from the authentication server 120.

In response to a receipt of the access request 230 from the network device 110 the authentication server 120 may be arranged to compare the received authentication data of the requesting network device 110 to the reference authentication data stored in data storage accessible to the authentication server 120, such as an internal memory of the authentication server 120. In other words, the authentication server 120 may be arranged to perform a comparison if the data storage stores data entry, i.e. reference authentication data, corresponding to the authentication data received in the access request 230.

Further, the authentication server 120 may be arranged to generate, in response to a detection that a comparison result expresses that the authentication data of the requesting network device 110 and the reference authentication data correspond to each other, a request of a communication connection 240 from the server 140. The request of the communication connection 240 may be delivered to an entity arranged to perform control services 130 in the communication network and the request of the communication connection 240 comprises at least data indicating an identity of the requesting network device 110, but possibly also other data, such as an indicator of the result of the authentication performed by the authentication server 120 and other data relating e.g. to the connection establishment. The entity arranged to perform the control services 130 may be arranged to, on the basis of the data received in the signal 240, to generate a signal towards the server 140 to indicate the server 140 that the network device 110 is allowed to, from the authentication server 120 point of view, to communicate with the server 140. In other words, the server 140 is prepared for a communication connection so as to enable the server 140 to allocate a communication connection for the requesting network device 110. The allocation may e.g. comprise, but is not limited to, including data relating to the requesting network device 110 in data structure applied to in a context of a receipt of communication connection requests by the server 140. For example, the data included in the data structure may comprise data identifying the requesting network device 110. The server 140 may also acknowledge the preparation to the entity 130, which may also acknowledge it to the authentication server 120 (not shown in FIG. 2).

As a result of the above described operation by the authentication server 120 (cf. the signals 240 and 250 in FIG. 2) a communication connection is established between the authentication server 120 and the server 140 in order to serve the requesting network device 110 as will be described in the following.

The authentication server 120 may either in response to a positive authentication result, i.e. that the authentication data received from the network device 110 is valid, or in response to a receipt of an acknowledgement signal from the server 140 e.g. through the entity 130, generate an acknowledgement signal 260 to the requesting network device 110 wherein the acknowledgement signal 260 comprises data indicating the requesting network device 110 an acceptance to connect to the server 140. The acknowledgement signal 260 may comprise a network address to be used for the connection. The network address may e.g. be obtained from a network address space dedicated to a party managing at least the authentication server 120, such as a telecom operator. By utilizing a network address from a dedicated address space it is possible to establish so-called virtual private network between the communicating parties in order to improve a security in the communication.

Finally, the communication connection 270 may be setup to the server 140. This may be done so that the network device 110 generates a connection request using the network address provided to it in signal 260 to the authentication server 120 (signal 270 in FIG. 2) which recognizes the connection and combines it with the communication connection already in place between the authentication server 120 and the server 140 maintained by the authentication server 120. The combination may e.g. be performed by mapping the connections together. Through the communication connection between the network device 110 and the server 140 e.g. a registration of the network device 110 may be performed, but also other data may be exchanged.

In some example embodiments of the invention the request of the communication connection (cf. signals 240 and 250 in FIG. 2) to the server 140 is delivered over a secured communication channel. For example, the secured communication channel may be setup with a virtual private network (VPN) connection. Combining the secured communication channel between the authentication server 120 and the server 140 with the connection between the network device 110 and the authentication server 120 implemented with virtual private network a secured communication connection between the network device 110 and the server 140 may be setup.

The authentication server 120 arranged to perform at least part of the method may be a Radius server.

As described, the communication between the authentication server 120 and the server 140 may be performed through at least one entity 130 arranged to perform control operations in a communication network.

Still further, the authentication data applied to in the authentication may e.g. be at least one of: username and password; authentication certificate, but any other may also be applied to or any combination of these.

Figure 3:
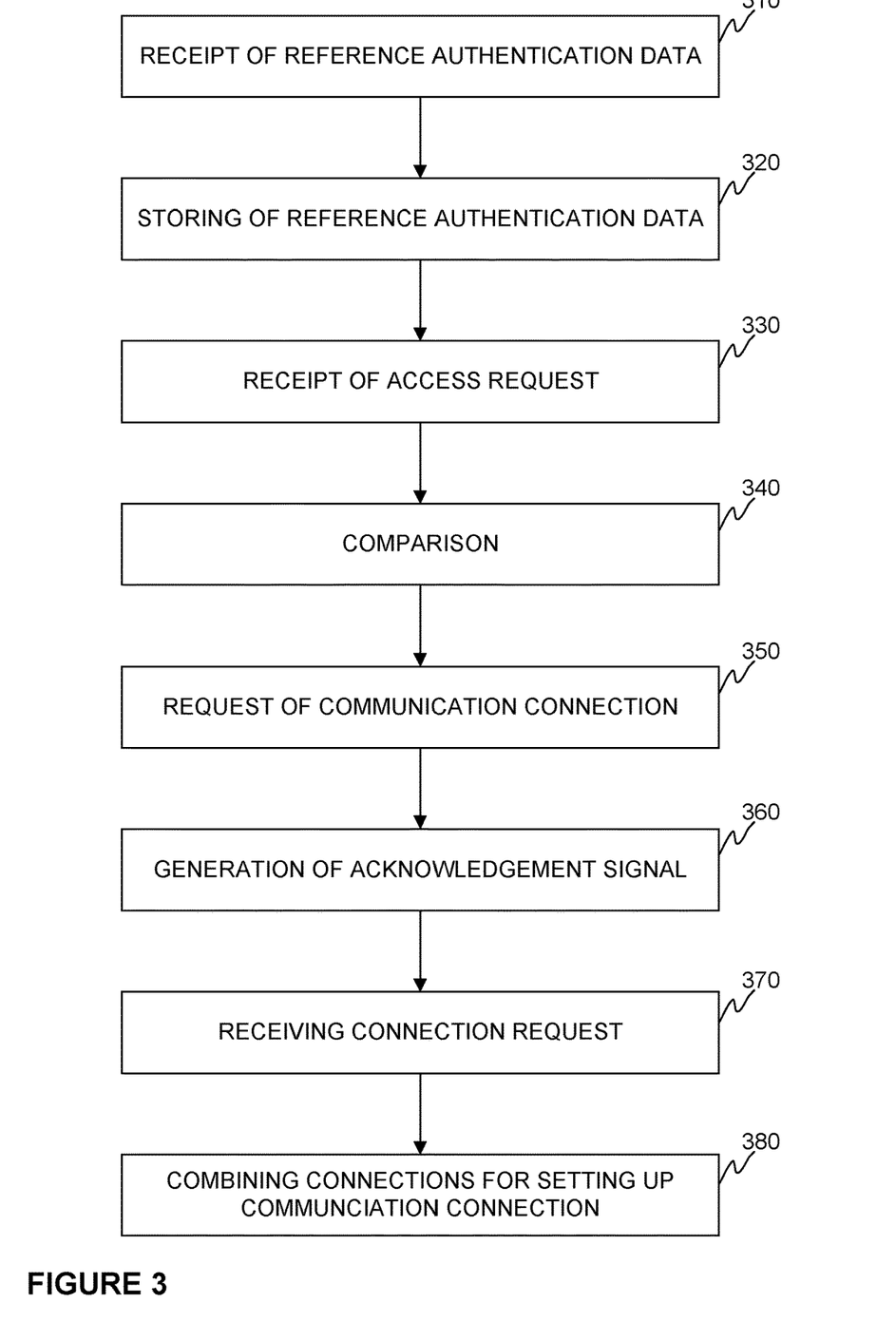
FIG. 3 illustrates schematically a method according to an embodiment of the invention.

FIG. 3 illustrates schematically a method according to an example embodiment of the invention. The method as schematically illustrated in FIG. 3 corresponds, at least to some extent, to the description given in the context of FIG. 2. The method steps may e.g. be the following:

a) receiving 310, by an authentication server 120, reference authentication data from the server 140, the reference authentication data defining access parameters for a network device 110, b) storing 320, by the authentication server 120, the reference authentication data in the authentication server 120, c) receiving 330, by the authentication server 120, an access request from a requesting network device 110, the access request comprising authentication data for the requesting network device 110, d) comparing 340, by the authentication server 120, the authentication data of the requesting network device 110 to the reference authentication data, e) in response to a detection that a comparison result expresses that the authentication data of the requesting network device 110 and the reference authentication data correspond to each other requesting 350, by the authentication server 120, a communication connection from the server 140, a request of the communication connection 240; 250 comprising data indicating an identity of the requesting network device 110 to the server 140, f) generating 360, by the authentication server 120, an acknowledgement signal to the requesting network device 110 the acknowledgement signal indicating the requesting network device 110 an acceptance to connect to the server 140 and a network address to be used for the connection, g) receiving 370 a connection request from the network device 110 with the network address provided to the network device 110 to be used for the connection, and h) combining 380 the connection request from the network device 110 with the communication connection setup between the authentication server 120 and the server 140 for setting up the communication connection between the network device 110 and the server 140.

For sake of clarity the method may comprise other steps as described above as well as the described method steps may comprise sub-procedures in accordance with the other description of the present invention.

Figure 4:
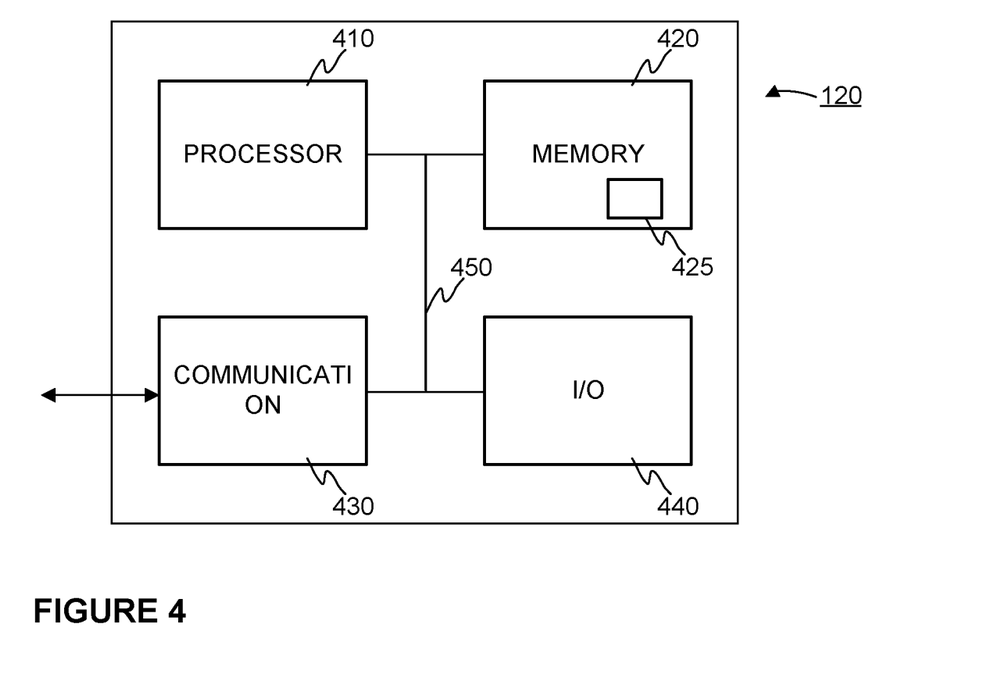
FIG. 4 illustrates schematically an authentication server device according to an embodiment of the invention.

FIG. 4 illustrates schematically an authentication server device 120 in accordance with an example embodiment of the invention suitable for performing the method as described. The authentication server 120 of FIG. 4 illustrates schematically as a block diagram a non-limiting example of the authentication server 120. The block diagram of FIG. 4 depicts some components of an apparatus that may be employed to implement an operation of the authentication server 120. The apparatus comprises a processor 410 and a memory 420. The memory 420 may store data and computer program code 425. The apparatus may further comprise communication means 430 for wired and/or wireless communication with other apparatuses, such as other entities implementing the functionalities as described. Furthermore, I/O (input/output) components 440 may be arranged, together with the processor 410 and a portion of the computer program code 425, to provide a user interface for receiving input from a user and/or providing output to the user. In particular, the user I/O components may include user input means, such as one or more keys or buttons, a keyboard, a touchscreen or a touchpad, etc. The user I/O components may include output means, such as a display or a touchscreen. The components of the apparatus may be communicatively coupled to each other via a bus 450 that enables transfer of data and control information between the components.

The memory 420 and a portion of the computer program code 425 stored therein may be further arranged, with the processor 410, to cause the apparatus, i.e. the authentication server 120, to perform a method as described in the foregoing description. The processor 410 may be configured to read from and write to the memory 420. Although the processor 410 is depicted as a respective single component, it may be implemented as respective one or more separate processing components. Similarly, although the memory 420 is depicted as a respective single component, it may be implemented as respective one or more separate components, some or all of which may be integrated/removable and/or may provide permanent/semi-permanent/dynamic/cached storage.

The computer program code 425 may comprise computer-executable instructions that implement functions that correspond to steps of the method as will be described when loaded into the processor 410. As an example, the computer program code 425 may include a computer program consisting of one or more sequences of one or more instructions. The processor 410 is able to load and execute the computer program by reading the one or more sequences of one or more instructions included therein from the memory 420. The one or more sequences of one or more instructions may be configured to, when executed by the processor 410, cause the apparatus to perform the method be described. Hence, the apparatus may comprise at least one processor 410 and at least one memory 420 including the computer program code 425 for one or more programs, the at least one memory 420 and the computer program code 425 configured to, with the at least one processor 410, cause the apparatus to perform the method as described.

The computer program code 425 may be provided e.g. a computer program product comprising at least one computer-readable non-transitory medium having the computer program code 425 stored thereon, which computer program code 425, when executed by the processor 410 causes the apparatus to perform the method. The computer-readable non-transitory medium may comprise a memory device or a record medium such as a CD-ROM, a DVD, a Blu-ray disc or another article of manufacture that tangibly embodies the computer program. As another example, the computer program may be provided as a signal configured to reliably transfer the computer program.

Still further, the computer program code 425 may comprise a proprietary application, such as computer program code for executing the setup of the communication connection in the manner as described.

Any of the programmed functions mentioned may also be performed in firmware or hardware adapted to or programmed to perform the necessary tasks.

Some aspects of the present invention relate to a communication system comprising an authentication server 120 implementing the method as described.

For sake of completeness, it is worthwhile to mention that the server device 140 may be established with the same hardware as the authentication server device 120 as described in the foregoing description wherein the server device 140 is arranged to perform dedicated operations defined for it.

The specific examples provided in the description given above should not be construed as limiting the applicability and/or the interpretation of the appended claims. Lists and groups of examples provided in the description given above are not exhaustive unless otherwise explicitly stated.

What is claimed is:

1. A method for setting up a communication connection to a server for a network device, the method comprising:
   receiving, by an authentication server device, reference authentication data from the server, the reference authentication data defining access parameters for a network device,
   storing, by the authentication server device, the reference authentication data in the authentication server device,
   receiving, by the authentication server device, an access request from a requesting network device, the access request comprising authentication data for the requesting network device,
   comparing, by the authentication server device, the authentication data of the requesting network device to the reference authentication data,
   in response to a detection that a comparison result expresses that the authentication data of the requesting network device and the reference authentication data correspond to each other requesting, the authentication server device generating a request for a setup of a communication connection from the server with the authentication server device, the request of the communication connection comprising data indicating an identity of the requesting network device to the server so the communication connection can be established between the authentication server device and the server,
   generating, by the authentication server device, an acknowledgement signal to the requesting network device, the acknowledgement signal indicating the requesting network device an acceptance to connect to the server and a network address to be used for the connection,
   receiving a connection request from the network device with the network address provided to the network device to be used for the connection, and
   combining the connection request from the network device with the communication connection set up between the authentication server device and the server for setting up the communication connection between the network device and the server.

2. The method of claim 1, wherein the request of the communication connection to the server is delivered over a secured communication channel.

3. The method of claim 2, wherein the secured communication channel is set up with a virtual private network connection.

4. The method of claim 1, wherein the network address to be used for the connection between the network device and the authentication server is selected among dedicated network address space of the authentication server for communicating in a virtual private network.

5. The method of claim 1, wherein the authentication server device is a Radius server.

6. The method of claim 1, wherein a communication between the authentication server and the server is performed through at least one entity arranged to perform control operations in a communication network.

7. The method of claim 1, wherein the authentication data applied to in the authentication is at least one of: username and password; authentication certificate.

8. An authentication server device for setting up a communication connection to a server for a network device, the authentication server device comprising:
   at least one processor;
   at least one memory including computer program code;
   the at least one memory and the computer program code configured to, with the at least one processor, cause the authentication server device to:
   receive reference authentication data from the server, the reference authentication data defining access parameters for a network device,
   store the reference authentication data in the authentication server device,
   receive an access request from a requesting network device, the access request comprising authentication data for the requesting network device,
   compare the authentication data of the requesting network device to the reference authentication data,
   request, in response to a detection that a comparison result expresses that the authentication data of the requesting network device and the reference authentication data correspond to each other, a communication connection from the server with the authentication server device, a request of the communication connection comprising data indicating an identity of the requesting network device to the server so the communication connection can be established between the authentication server device and the server,
   generate an acknowledgement signal to the requesting network device, the acknowledgement signal indicating the requesting network device an acceptance to connect to the server and a network address to be used for the connection,
   receive a connection request from the network device with the network address provided to the network device to be used for the connection, and
   combine the connection request from the network device with the communication connection set up between the authentication server device and the server for setting up the communication connection between the network device and the server.

9. The authentication server device of claim 8, wherein the authentication server device is arranged to deliver the request of the communication connection to the server over a secured communication channel.

10. The authentication server device of claim 9, wherein the authentication server device is arranged to set up the secured communication channel with a virtual private network connection.

11. The authentication server device of claim 8, wherein the authentication server device is a Radius server.

12. The authentication server device of claim 8, wherein the authentication server device is arranged to perform a communication between the authentication server device and the server through at least one entity arranged to perform control operations in a communication network.

13. The authentication server device of claim 8, wherein the authentication server device is arranged to use as the authentication data applied to in the authentication at least one of: username and password; authentication certificate.

14. A communication system, comprising:
a network device,
a server, and
an authentication server device comprising:
at least one processor;
at least one memory including computer program code;
the at least one memory and the computer program code configured to, with the at least one processor, cause the authentication server device to:
receive reference authentication data from the server, the reference authentication data defining access parameters for a network device,
store the reference authentication data in the authentication server device,
receive an access request from a requesting network device, the access request comprising authentication data for the requesting network device,
compare the authentication data of the requesting network device to the reference authentication data,
request, in response to a detection that a comparison result expresses that the authentication data of the requesting network device and the reference authentication data correspond to each other, a communication connection from the server with the authentication server device, a request of the communication connection comprising data indicating an identity of the requesting network device to the server so the communication connection can be established between the authentication server device and the server,
generate an acknowledgement signal to the requesting network device, the acknowledgement signal indicating the requesting network device an acceptance to connect to the server and a network address to be used for the connection,
receive a connection request from the network device with the network address provided to the network device to be used for the connection, and
combine the connection request from the network device with the communication connection set up between the authentication server device and the server for setting up the communication connection between the network device and the server.

15. A computer program product for setting up a communication connection to a server which, when executed by at least one processor, cause an authentication server device to perform a method comprising:
receiving, by an authentication server device, reference authentication data from the server, the reference authentication data defining access parameters for a network device,
storing, by the authentication server device, the reference authentication data in the authentication server device,
receiving, by the authentication server device, an access request from a requesting network device, the access request comprising authentication data for the requesting network device,
comparing, by the authentication server device, the authentication data of the requesting network device to the reference authentication data,
in response to a detection that a comparison result expresses that the authentication data of the requesting network device and the reference authentication data correspond to each other requesting, by the authentication server device, a setup of a communication connection from the server with the authentication server device, a request of the communication connection comprising data indicating an identity of the requesting network device to the server so the communication connection can be established between the authentication server device and the server,
generating, by the authentication server device, an acknowledgement signal to the requesting network device, the acknowledgement signal indicating the requesting network device an acceptance to connect to the server and a network address to be used for the connection,
receiving a connection request from the network device with the network address provided to the network device to be used for the connection, and
combining the connection request from the network device with the communication connection set up between the authentication server device and the server for setting up the communication connection between the network device and the server.

\* \* \* \* \*